United States Patent [19]

Olsztynski et al.

[11] 4,362,237

[45] Dec. 7, 1982

[54] MATERIAL CONVEYING SYSTEM WITH A PNEUMATICALLY OR MECHANICALLY OPERATED SUBSTANTIALLY UPRIGHT CONVEYOR PROVIDED WITH A DEVICE FOR LOOSENING AND TRANSPORTING THE MATERIAL TO THE UPRIGHT CONVEYOR

[75] Inventors: Adalbert Olsztynski, Wolfsburg; Bernd Hardegen, Braunschweig, both of Fed. Rep. of Germany

[73] Assignee: Buehler-Miag GmbH, Braunschweig, Fed. Rep. of Germany

[21] Appl. No.: 166,254

[22] Filed: Jul. 7, 1980

[30] Foreign Application Priority Data

Jul. 12, 1979 [DE] Fed. Rep. of Germany ....... 2928162

[51] Int. Cl.³ .......................................... B65G 65/20
[52] U.S. Cl. ..................................... 198/509; 37/190; 198/518
[58] Field of Search ................ 198/509, 518; 37/97, 37/189, 190; 414/139, 144, 145

[56] References Cited

U.S. PATENT DOCUMENTS

| | | | |
|---|---|---|---|
| 1,858,327 | 5/1932 | Hays | 37/190 X |
| 2,968,879 | 1/1961 | Rusich | 198/518 X |
| 3,968,998 | 7/1976 | Wolf | 406/58 |
| 3,974,580 | 8/1976 | Satterwhite | 37/189 |
| 4,230,220 | 10/1980 | Iino | 198/509 |

FOREIGN PATENT DOCUMENTS

| | | |
|---|---|---|
| 1506997 | 12/1971 | Fed. Rep. of Germany . |
| 2116694 | 10/1972 | Fed. Rep. of Germany ...... 414/145 |
| 2143133 | 1/1973 | Fed. Rep. of Germany ...... 414/139 |
| 2210311 | 9/1973 | Fed. Rep. of Germany ...... 414/144 |

Primary Examiner—Jeffrey V. Nase
Attorney, Agent, or Firm—Michael J. Striker

[57] ABSTRACT

A material conveyor system comprises a substantially upright mechanically or pneumatically operated conveyor and a device for loosening material and for feeding the same into the upright conveyor. The device comprises a substantially horizontally extending tubular jib adjustably connected to an upright support frame supporting the upright conveyor. The tubular jib rotatably supports on its outer periphery a material loosening and transporting device comprising a plurality of axially extending circumferentially displaced shovels which feed the loosened material through at least one elongated inlet opening into the interior of the tubular jib through which a conveyor extends which feeds the material in longitudinal direction of the jib into the upright conveyor. If the upright conveyor is pneumatically operated, the conveyor extending axially to the jib is preferably a screw conveyor and when the upright conveyor is mechanically operated, the conveyor through the jib is a band conveyor extending also through and forming part of the upright conveyor.

8 Claims, 4 Drawing Figures

MATERIAL CONVEYING SYSTEM WITH A PNEUMATICALLY OR MECHANICALLY OPERATED SUBSTANTIALLY UPRIGHT CONVEYOR PROVIDED WITH A DEVICE FOR LOOSENING AND TRANSPORTING THE MATERIAL TO THE UPRIGHT CONVEYOR

BACKGROUND OF THE INVENTION

The present invention relates to a device for feeding material to a mechanically or pneumatically operated substantially upright conveyor with a boom connected to a lower portion of the supporting frame for the upright conveyor, which boom is provided in the interior thereof with a conveyor and on the outside thereof with a rotatable material receiving tool which receives the material and transports it to the conveyor in the interior of the boom.

Such devices have the task to loosen the material to be transported from a heap and to take the material along and to feed it to the upright conveyor or in the region of the action of the latter, whereby the upright conveyor may be a suction tube, a bucket conveyor, a chain conveyor or a band conveyor provided with plates extending normal to the band spaced from each other in the direction of the latter to form a plurality of cells for receiving the material therebetween and in which the outer ends of the cells are closed by a cover band extending parallel to the band of the conveyor.

Such conveyor systems are known in the art and one known system comprises as material receiving tool a plurality of angularly displaced arms turnably mounted at the lower end of a substantially vertically extending suction transporting tube, in which the arms are provided with screw conveyors, which during their rotation pick up the material and transport it to the lower end of the suction tube conveyor (Deutsche Auslegungsschrift No. 21 05 143).

The German Offenlegungsschrift No. 21 49 647 discloses another system of the aforementioned kind in which in front of the suction nozzle of the upright suction tube conveyor at least one horizontally arranged rotating cutter spindle is provided which loosens the material and transports it towards the suction nozzle, whereby in order to increase the material transport a screw conveyor is arranged between the cutter spindle and the nozzle which collects the material loosened by the cutter spindle and transports the same to the suction nozzle.

Another system is also known in which the upright conveyor in form of a bucket conveyor is provided at its lower end with an axially extendable in a vertical plane tiltable boom provided with a movable scraper blade conveyor which loosens the material and transports it over a bottom plate or a trough to the buckets of the upright conveyor (Deutsche Auslegungsschrift No. 22 02 609, Deutsche Offenlegungsschrift No. 22 10 311).

Another system of the aforementioned kind is known from the German Auslegungsschrift No. 25 28 483, in which the bendable lower end portion of the suction tube of the upright conveyor is provided with a wide suction nozzle which is placed on a tractor and in which a scraper screw is arranged directly in front of the suction nozzle, which scraper screw is mounted on carrying arms connected to the tractor tiltably about its pivot axis, whereby the material loosened by the scraper screw is transported towards the suction nozzle.

All of the above-mentioned known systems have the disadvantage that the material receiving tools transport only a portion of the picked up material to the upright conveyor since part of the picked up material flows laterally away from the material loosening and transporting tools. This evidently detrimentally influences the output of the upright conveyor, respectively of the whole system.

The German No. 15 06 997 discloses further a conveyor system for unloading of ships in which loss of the material received by the loosing and transporting tools is avoided. In this known system, a tubular boom is mounted on the support frame of the upright conveyor in which at the free end of the boom a bucket wheel is mounted as a material receiving tool and in which the boom receives in its interior the offset section of the upright conveyor constituted by two transporting bands, whereby the material taken up by the bucket wheel is transported over a chute in its interior onto one of the transporting bands which is guided up to beneath the chute and transported by this one transporting band between the two transporting runs of the two bands of the upright conveyor. This arrangement includes further a shovel connected to the bottom of the wheel which during turning of the support for the upright conveyor picks up the material and pushes it into the acting region of the bucket wheel. This known system can, due to the relative small width of the bucket wheel, strip the material from a heap only with small cuts so that an extensive movement of the support of the upright conveyor is necessary if large material heaps have to be removed. If the support for the upright conveyor is not able, for some reason, to turn about its vertical axis, for instance, in the corner of the ship's loading space, the material can, in this case, not be received by the shovel and transported toward the bucket wheel.

SUMMARY OF THE INVENTION

It is an object of the present invention to provide a material conveying system provided with an improved device for loosening and transporting the material to the upright conveyor so that the output of the system will be increased.

With these and other objects in view, which will become apparent as the description proceeds, the material conveying system according to the present invention mainly comprises substantially upright conveyor means, substantially upright support means supporting the upright conveyor means, and means for loosening the material and for feeding the same into the upright conveyor means and comprising a tubular jib connected to a lower portion of the support means and projecting substantially horizontally therefrom and being provided at the upper side thereof with at least one elongated material inlet opening and including rotating material loosening and transporting means at the outer surface of the tubular jib extending substantially over the whole length thereof for loosening the material and transporting the same through said at least one inlet opening into the interior of the tubular jib and a conveyor in the interior of the tubular jib receiving the material passing through the opening and transporting the same to the upright conveyor means.

Due to this construction, the material to be transported is picked up over the whole length of the jib so that per time unit a considerably larger amount of material is picked up and transported to the upright conveyor as can be obtained with loosening and transporting tools according to the prior art, whereby, in addition, the material is received directly adjacent the upright conveyor and the efficiency of the system is increased.

According to a further characteristic feature of the present invention, the jib is constructed as a hollow cylinder having an outer peripheral surface supporting the rotating material loosening and transporting means and an inner peripheral surface forming a transporting surface for the conveyor extending through the interior of the tubular jib or in which the conveyor extending through the interior of the tubular jib has a conveying surface separated from the inner surface of the latter. The jib can thereby be constructed as a one piece hollow cylinder with an inlet opening extending over the whole length thereof, or the jib may be formed from a plurality of hollow cylindrical sections coaxially connected to each other and each provided with a material inlet opening extending substantially over the whole length of each section. If the inner peripheral surface of the tubular jib directly forms a transporting surface along which the materials move, then it is advisable to construct the hollow cylinder or the hollow cylindrical sections double-walled, that is, by an outer tube and a coaxial inner tube radially spaced therefrom, so that during wear only the inner tube needs to be exchanged.

The material loosening and transporting means preferably comprise a drum provided over the whole length thereof with circumferentially spaced shovels. To facilitate transport of this drum, it is preferably constructed of a plurality of coaxial drum sections, each provided over the whole length thereof with a plurality of circumferentially spaced shovels. Advantageously, these drum sections which are rotatably mounted on the jib, comprise each a pair of axially spaced annular discs and the shovels extend between and being fastened to these annular discs. This will result in a simple construction of reduced mass.

In order to assure a gradual pickup of material and a gradual discharge of the same, and therewith to avoid a sudden loading or respective unloading of the shovel drum, the shovels at one drum section are displaced in circumferential direction with respect to the shovels at the adjacent drum section. The drum sections may all be driven in the same direction or in opposite directions and by rotating the individual drum sections in opposite directions, it is possible to reduce the moments acting on the latter.

In order to obtain high output of the system according to the present invention, it is important that the available cross-section of the tubular beam is optimally used. This is obtained according to a further characteristic feature of the present invention that the conveyor in the interior of the tubular jib is constructed as a screw conveyor. With such a screw conveyor, it is practically possible to use the total inner cross-section of the tubular jib to transport thereby the material loosened by the shovel drum and fed by the latter through the inlet opening or openings into the tubular jib. The screw conveyor preferably comprises a central tube serving as a suction tube which can, by providing a corresponding suction nozzle thereon, be used to receive small residual material and a screw spiral surrounding and fixedly connected to the central tube.

If the interior surface of the jib should not form itself a material transporting surface, then the conveyor in the interior of the jib is constituted by a band conveyor, preferably provided with a plurality of plates projecting spaced from each other in the direction of the band substantially normal therefrom to form a succession of material receiving cells and this band conveyor is then continued and forms at the same time the upright conveyor.

The novel teachings which are considered as characteristic for the invention are set forth in particular in the appended claims. The invention itself, however, both as to its construction and its method of operation, together with additional objects and advantages therefor, will be best understood from the following description of specific embodiments when read in connection with the accompanying drawings.

DESCRIPTION OF THE PREFERRED EMBODIMENTS

Figure 1:
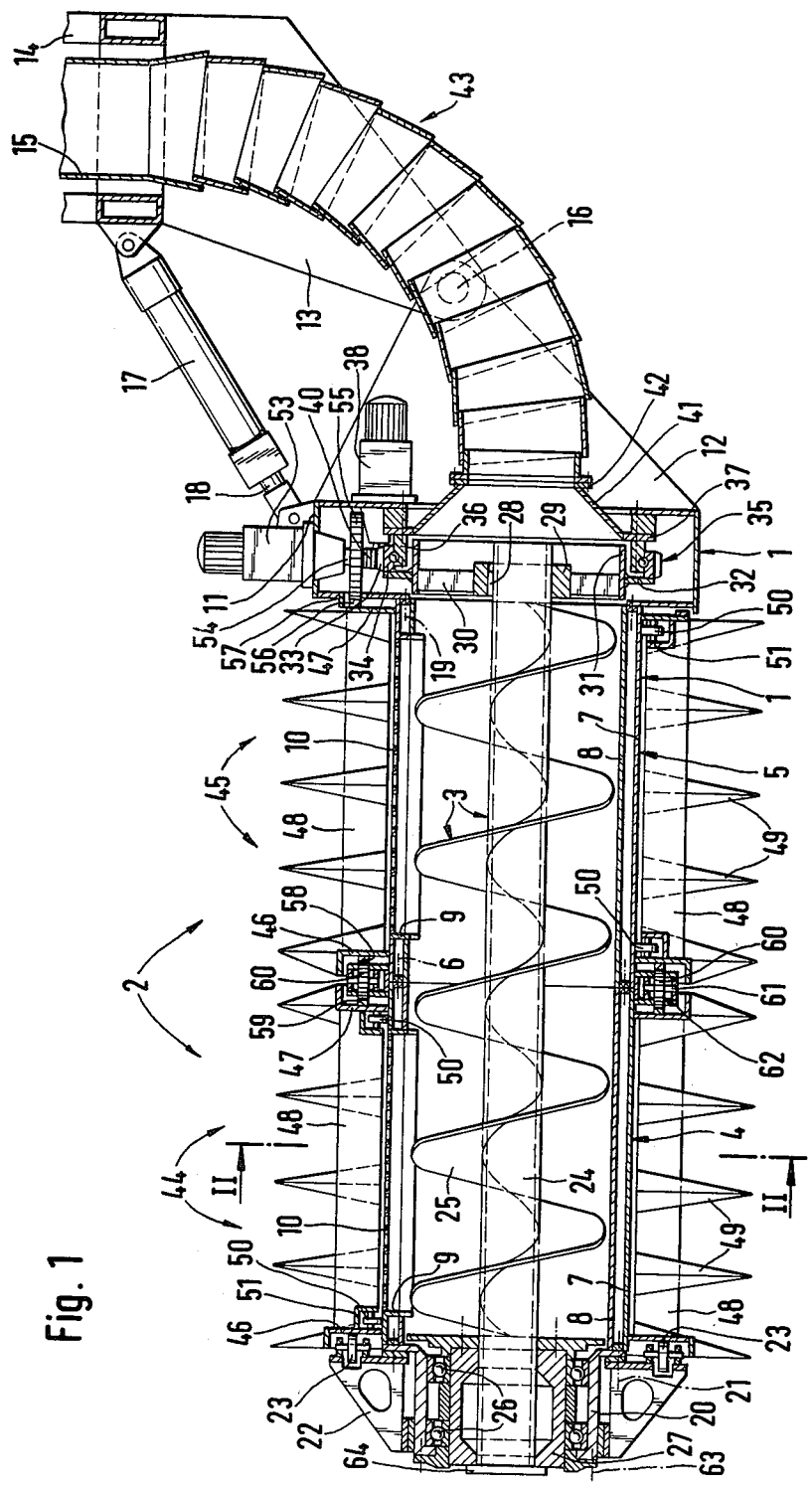
FIG. 1 is an axial cross-section through one modification of the system according to the present invention showing only part of the upright conveyor.

The transporting system according to the present invention is used to transport heavy grain or similar material such as coarsely ground soya or kopra. The system illustrated in FIGS. 1 and 2 comprises a tubular jib 1, material loosening and transporting tools in form of a drum 2 provided with shovels and a conveyor in the interior of the tubular jib constructed as a screw conveyor 3.

The jib 1 is constructed as a hollow cylinder comprising two double-walled hollow cylinder sections 4 and 5. The hollow cylinder sections 4 and 5 are releasably connected by screw 6 to each other and each including an outer tube 7 and a coaxially therein inserted inner tube 8 connected thereto easily exchangeable. Each of the hollow cylinder sections 4 and 5 is provided at the upper side thereof with an inlet opening 9 which is covered by a screen 10 so that coarse impurities may not enter into the tubular sections. The rear or right end, as viewed in FIG. 1, of the boom 1 forms a box-shaped mounting member 11 connected by screws 19 with the hollow cylinder section 5 to a compact unit and provided with two laterally arranged transversely spaced linking projections 12 engaging at the outer ends with corresponding linking projections 13 of a support frame 14 of an upright conveyor in form of a suction tube 15, only partly shown in FIG. 1. The linking projections 12 and 13 are pivotally connected at adjacent ends by pivot pins 16. Two transversely spaced cylinder and piston units are provided the cylinders 17 of which are pivotally connected at one end to the support frame 14 and the piston rods 18 thereof are pivotally connected at the outer ends with the mounting member 11 so as to hold jib 1 in the position shown or to tilt the latter in a vertical plane.

A cylindrical bearing body 20 is fixedly connected by screws 21 to the front end, shown in FIG. 1 as the left end, of the hollow cylindrical section 4. The body 20 is provided at its outer periphery with a plurality of roll supports 22 which are circumferentially spaced from each other and each of which carries a guide roll 23 rotatable about a vertical axis and engaging the left end, as viewed in FIG. 1, of the drum 2.

The screw conveyor 3 in the interior of the tubular boom 1 comprises a central tube 24 and a screw spiral 25 surrounding and fixedly connected to the central tube. The screw conveyor 3 is at one end rotatably supported in the bearing body 20 by means of a roller bearing 26 and an intermediate ring 27. The other end of the screw conveyor 3 is received in a hub 29 to which the central tube 24 is connected by a key 28 for rotation therewith. The hub 29 is held by means of three arms 30 in a tubular segment 31 which borders directly onto the inner tube 8 of the hollow cylinder section 5 coaxially therewith. The tube section 31 is connected by a flange 32 welded thereto with a bearing ring 34 of a ball bearing 35 and the ring 34 is provided at its outer periphery with a gearing 33. The other ring 36 of the ball bearing 35 is connected to a support 37 in the mounting part 11. A gear motor 38 mounted on the outside of the support or mounting part 11 is provided to rotate the screw conveyor 3 about its axis. The motor 38 has a drive shaft 39 on which a pinion 40 is mounted for rotation therewith which meshes with the gearing provided on the bearing ring 34 of the ball bearing 35. A frustoconical connecting tube 41 is connected on the support 37 coaxially with and following the tubular segment 31 and the frustoconical connecting tube is releasably connected by a flange connection 42 with a sectioned tube 43 of standard construction and forming a connection between the interior of the tubular jib 1 and a vertical telescopable suction transporting tube 15 forming the upright conveyor of the system.

Figure 2:
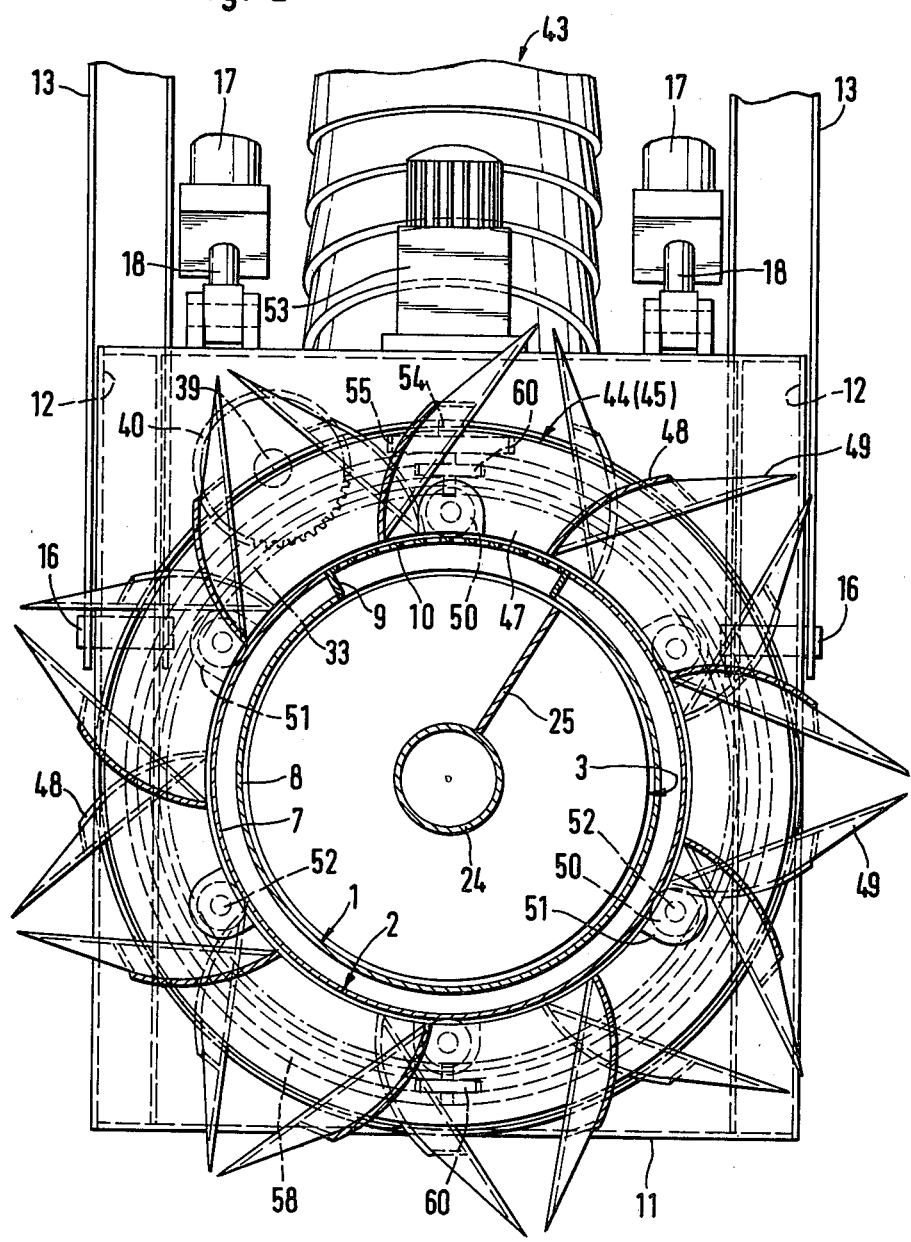
FIG. 2 is a cross-section taken along the line II—II of FIG. 1 and drawn to an enlarged scale.

The drum 2 is composed of two coaxial drum sections 44 and 45 which are respectively driven in opposite direction of rotation. Each of the two drum sections 44 and 45 comprises two annular shields 46 and 47 at opposite ends thereof and a plurality of circumferentially equally displaced shovels 48 which extend in axial direction from the shield 46 to the shield 47 and which are welded thereto. Each shovel 48 is provided with a plurality of pointed teeth 49 spaced uniformly from each other along the shovel 48 and are welded to the latter. The arrangement of the teeth 49 on the shovels 48 is made in such a manner that the row of teeth on one shovel 48 is displaced in direction of the drum axis relative to the row of teeth on the adjacent shovels. For simplification of the drawing, this feature is not illustrated in FIG. 1. The drum sections 44 and 45 are rotatably supported by means of rolls 50 on the jib 1 respectively on the hollow cylinder sections 4 and 5. For this purpose, six roll holders 51 are provided on the annular shields 46 and 47 uniformly spaced in circumferential direction from each other and each carrying, as shown in FIG. 2, a roll 50 rotatable about an axis 52 extending parallel to the longitudinal axis of the jib 1.

A gear motor 53 mounted on the mounting part 11 serves to rotate the drum sections 44 and 45 of the drum 2 about their axes. The motor 53 has a drive shaft 54 on which a bevel gear 55 is mounted for rotation therewith. The bevel gear 55 meshes with the teeth of an annular bevel gear 56 connected to the shield 47 of the drum section 45 which is protected from contact with the material to be transported by a cover sheet metal 57. An annular bevel gear 58 is connected to the shield 46 and a corresponding annular bevel gear 59 is connected to the shield 47 and the teeth of the two annular bevel gears mesh with the teeth of two bevel gears 60 which are arranged with respect to the axis of rotation of the drum 2 diametrically opposite each other, as shown in FIGS. 1 and 2, to transmit the drive from the drum section 45 to the drum section 44. The bevel gears 60 are each mounted for rotation about axles 61 which are supported in an annular support member 62 connected by a non-illustrated key to the jib 1, respectively to the two hollow cylinder sections 4 and 5 thereof.

The central tube 24 of the screw conveyor 3 is closed at its outer end, shown in FIG. 1 as left end, by a cover 64 which is connected by screws 63 to the intermediate ring 27. This cover may be replaced by a suction nozzle if small residual amounts of the material should be pneumatically transported. The end of the central tube 24 facing the adjacent sectioned tube 43 is preferably also closed by a closing member, for instance, a slide, which during use of the central tube 24 as a suction tube by hand or a corresponding drive may be opened or closed.

To receive the material to be transported, for instance, from the interior of a ship, the jib 1 is moved toward the material by moving the supporting frame 14 and turning the latter about its axis, by known means not shown in the drawing, toward the material and be brought into the required working position by the two cylinder and piston units 17 and 18. After starting the motors 38 and 53, the jib 1 is moved into the material. The motor 38 drives the screw conveyor 3 about its axis and the screw conveyor rotates with a predetermined number of revolutions per time unit. The drive motor 53 turns the drum 2 with the drum section 44 rotating in clockwise direction and the drum section 45 in counter-clockwise direction. The interiors of suction tube 15 and the sectioned tube 43 connected to the lower end thereof are maintained in the usual manner at the necessary underpressure for the pneumatic transportation of the material, which is produced by a suction pump of known construction, not shown in the drawing.

The teeth 49 on the shovels 48 penetrate into the material and loosen the same and the shovels 48 scoop up the material and move the latter along the hollow cylindrical sections 4 and 5 until the material drops by gravity through the screens 10 and the inlet openings 9 into the interior of the two hollow cylindrical sections 4 and 5 and therewith in the region of the action of the screw conveyor 3. The screw conveyor 3 transports then the material on the inner surface of the inner tubes 8 of the two hollow cylindrical sections and pushes the material through the tubular segment 31 and the connecting tube 41 into the sectioned tube 43. The suction prevailing therein sucks then the material into the suction tube 15 of the upright conveyor from which it is taken out and transported further in a known manner.

Since in this construction the rotating shovels 48, which extend over the whole length of the jib 1, pick up the material with relative high speed and transport the same in its totality to the upright conveyor, respectively to the suction tube 15, a quick emptying of the loading compartment and therewith a maximum conveying output is obtained.

Figure 3:
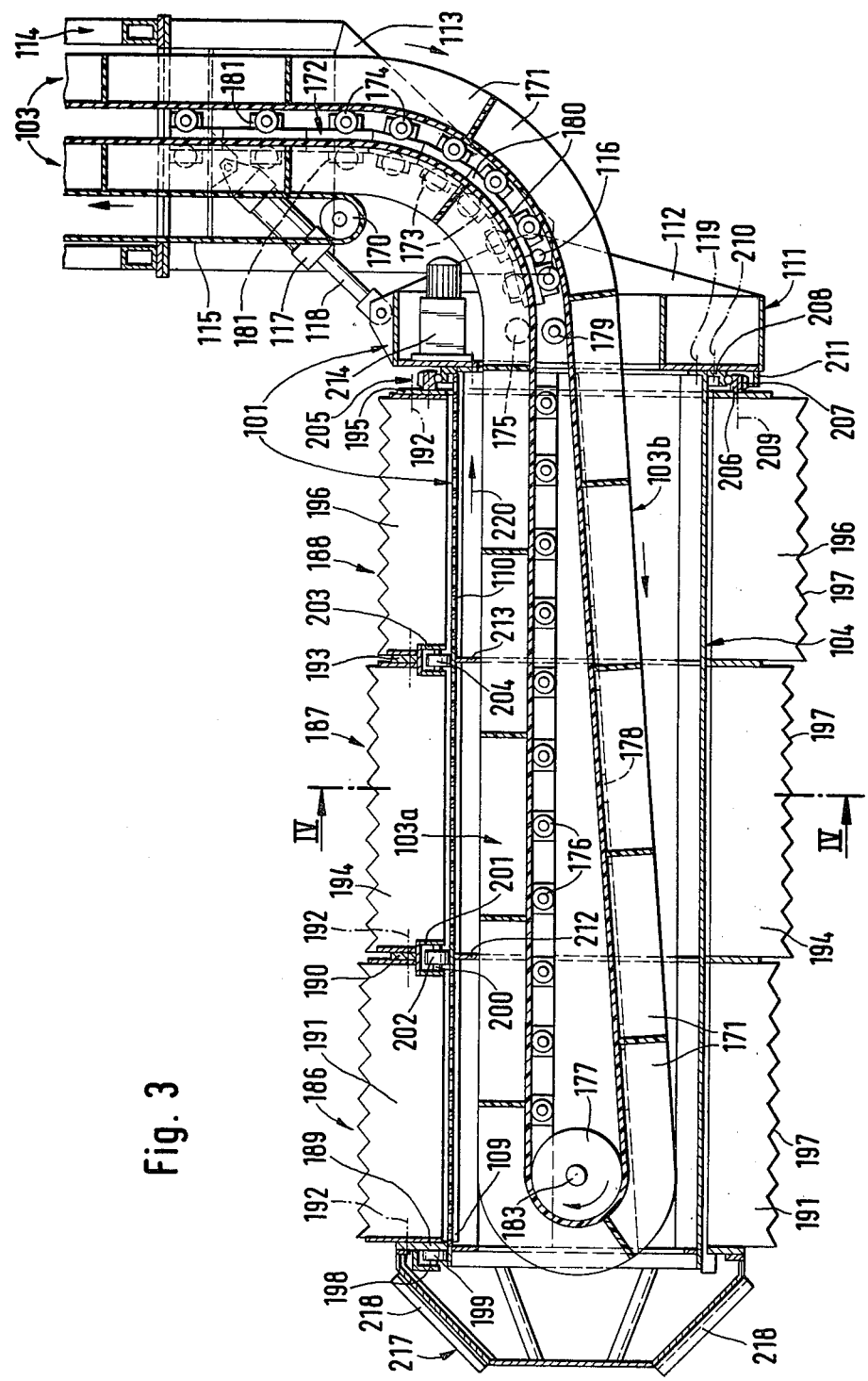
FIG. 3 is a longitudinal cross-section through a second embodiment according to the present invention.
Figure 4:
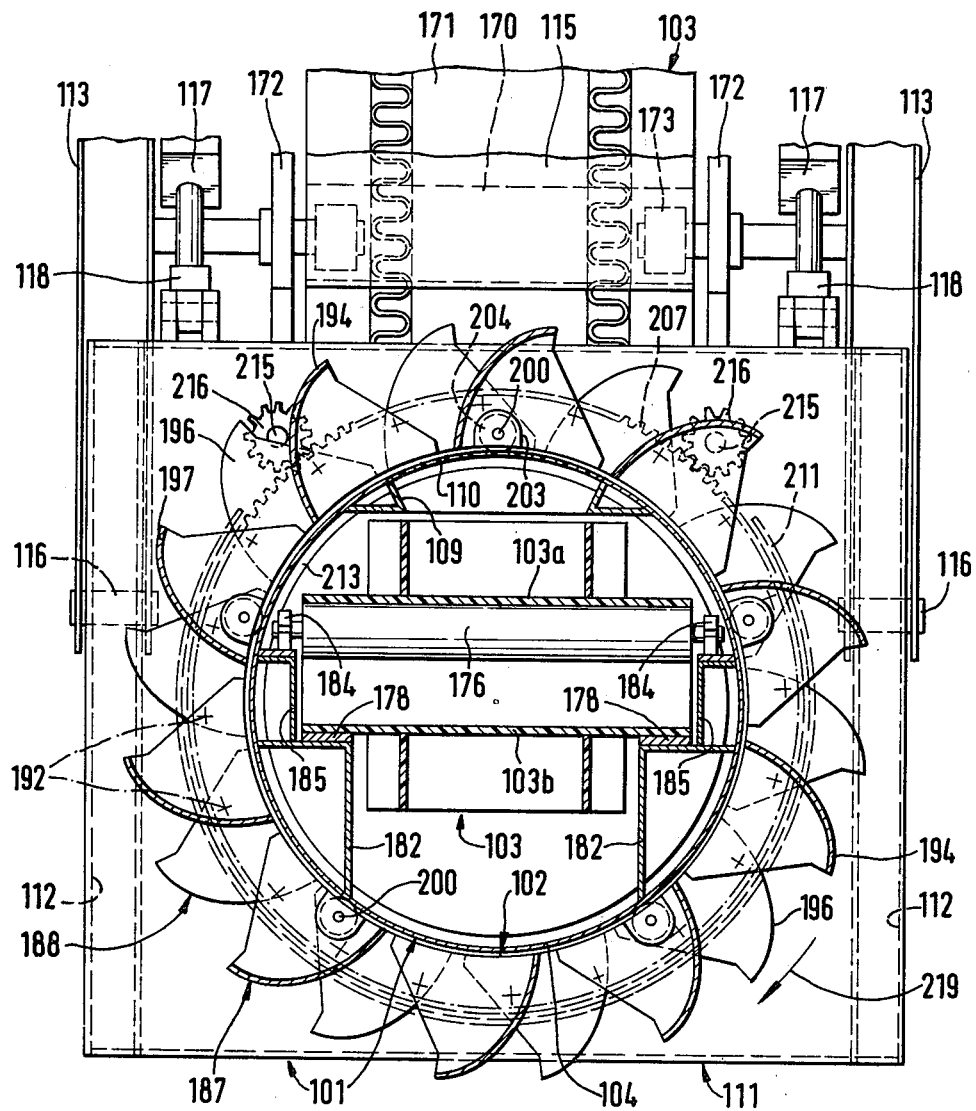
FIG. 4 is a cross-section taken along the line IV—IV of FIG. 3 and drawn to an enlarged scale.

The loosening and transporting means of the second embodiment shown in FIGS. 3 and 4 likewise comprises three essentially construction elements, that is, a jib 101, a shovel drum 102 turnably mounted thereon, as well as a conveyor in form of a cell band 103 arranged in the interior of the jib 101 in which the cell band 103 extends at the same time through the upright conveyor. The jib 101 consists of a one-part hollow cylinder 104 provided substantially over the whole length thereof on the upper side with an inlet opening 109 covered by a screen 110, as well as of a support member 111 connected to the right end, as viewed in FIG. 3, of the hollow cylinder 104 by screws 119. Two laterally displaced linking projections 112 on the support member 111 are tiltably connected by pivot pins 116 to corresponding linking connections 113 on an upright support frame 114. The support frame 114 receives the vertically section of the cell band 103 which forms the actual upright conveyor. In the vertical section of the cell band 103, its transporting run 103a is coordinated with a cover band 115 which is guided over a drum 170 in the support frame 114 and which closes the cells 171 of the cell band 103, so that the material transported in the cells will not be inadvertantly discharged therefrom. In order to hold the jib 101 in the position shown in FIG. 3, or for tilting the jib 101 in a vertical plane, two cylinder and piston units are provided, the cylinders 117 of which are pivotally connected to the supporting frame 114, whereas the pison rods 118 thereof are pivotally connected to the support member 111.

The empty run 103b of the cell band 103 passes downwardly from an upper, not illustrated, reversing station over a group of guide rolls 174 arranged on one side of a roll support 172 and from there over a guide roll 179 in the support member 111 as well as over a roll of guide plates 178 in the hollow cylinder 104 to a reversing drum 177 at the front end of the hollow cylinder 104. The transporting run 103a of the cell band 103 passes from the reversing drum 177 over a row of carrying rollers 176 in the hollow cylinder 104, a guide roll 175 in the support member 111 and a group of further guide rolls 173 at the other side of the roll support 172 to the upper, non-illustrated, reversing station. The roll support 172 is suspended in the support frame 104 and consists of a plurality of tiltably connected members 180, each of which is provided laterally with two bearings 181 in which the guide rolls 173 respectively 174 are turnably mounted by means of a bearing pin. The guide plates 178 are mounted laterally spaced from each other on two stepped platforms 182 arranged transversely spaced from each other in the interior of the hollow cylinder 104 and welded to the latter as best shown in FIG. 4. The reversing drum 177 is turnably mounted on a shaft 183 which is received in two transversely spaced bearings, not illustrated in the drawings. The carrying rolls 176 are respectively mounted in two bearings 184 which are arranged on platforms 185 fixed in the interior of the hollow cylinder 104. The drive of the cell band 103 is produced at the upper reversing station by a known electromotoric band drum drive, not illustrated in the drawing.

The shovel drum 102 of the embodiment shown in FIGS. 3 and 4 comprises three coaxially arranged drum sections 186, 187 and 188 which follow directly each other and which are driven in the same direction of rotation and are connected to each other to a compact unit. The drum section 186 comprises an annular disc 189, a second annular disc 190 which it shares with the drum section 187, and a plurality of circumferentially displaced shovels 191 fixedly but releasably connected to the discs 189 and 190 by screws 192. The drum section 187 is composed of the disc 190 which it shares with the drum section 186, an annular disc 193 which it shares with the drum section 188 and of a plurality of circumferentially displaced shovels 194 connected to the aforementioned discs by screws 192. The drum section 188 comprises the annular disc 193 which it shares with the drum section 186, an annular disc 195 and with a plurality of circumferentially displaced shovels 196 connected to the discs 193 and 195 by screws 192. Each of the shovels 191, 194 and 196 is provided at its outer edge with a serrated cutting edge 197. The shovels 191, 194 and 196 of the respective drum sections are, as best shown in FIG. 4, circumferentially displaced with regard to the shovels of the adjacent drum sections. To rollingly support the drum sections 186, 187 and 188 on the hollow cylinder 104 a plurality of rolls are provided on the annular discs 189, 190 and 193, that is, five rolls 199 are turnably mounted on axles 200 in five roll holders 198 which are equally circumferentially displaced mounted on the circumference of the annular disc 189, on the annular disc 190 are provided five circumferentially uniformly displaced roll holders 201 on which respectively the axles 200 of rolls 202 are mounted and on the annular disc 193 are provided five circumferentially uniformly displaced roll holders 203 on which the axles 200 of rollers 204 are turnably mounted. A bearing ring 206 of ball bearing 205 is connected by screws 209 to the annular disc 195 at one end of the drum section 188 and the bearing ring 206 is provided at the outer periphery with a gearing 207. The other bearing ring 208 of the ball bearing 205 is fixedly connected by screws 210 with the support member 111. A cover plate 211 of sheet metal mounted on the support member 211 protects the ball bearing 205 respectively the gearing 207 against contact with the material to be transported.

In order not to interrupt the supporting action of the rolls 202 and 204 during the movement thereof over the inlet opening 109, the screen 110 is in the region of the path of the rolls 202 supported by an annular flange 212 and in the region of the path of the rolls 204 by an annular flange 213 whereby the flanges 212 and 213 are welded to the screen 110 and to the hollow cylinder 104.

Two transversely displaced gear motors 214 are arranged in an upper region of the support member 111, the drive shafts 215 thereof each carry a pinion 216 fixedly connected thereto for rotation therewith and the teeth of the two pinions 216 respectively mesh with the teeth of the gearing 207 provided on the bearing ring 206 of the ball bearing 205.

A frustoconical head member 217 is mounted on the front end of the drum 102 and the member 217 is provided at its frustoconical outer surface with a plurality of uniformly displaced reaming plates 218. The head member 217 provided to facilitate penetration of the outer end of the jib 101 into a heap of material to be transported is connected by screws 192 to the front end of the drum 102.

The operation of the system as illustrated in FIGS. 3 and 4 corresponds substantially to the operation of the embodiment shown in FIGS. 1 and 2.

During operation of the system, the cell band 103 and the cover band 115 cooperating therewith are continuously driven in the direction of the arrows shown in FIG. 3. After the supporting frame 114 is moved in a known manner by means not shown in the drawing and after the jib 101 is turned in a horizontal plane and tilted in a vertical plane into its working position, the two gear motors 214 are actuated and the jib 101 is further moved into the material heap. The gear motors 214 drive the drum 102 over the drive shafts 215, the pinions 216 connected thereto and the gearing 207 on the bearing ring 206 of the ball bearing 205 in clockwise direction, as indicated by the arrow 219 in FIG. 4. The shovels 191, 194 and 196 of the three drum sections 186, 187 and 188 penetrate thereby by means of the serrated cutting edges 197 into the material, scoop it up and take it upwardly during the rotation until the material passes by gravity through the screen 110, the inlet opening 109 into the interior of the hollow cylinder 104 and into the cells 107 of the transporting run 103a of the cell band 103. The cell band 103 transports the material in the direction of the arrow 220 shown in FIG. 3 from the jib 102 respectively the hollow cylinder section 104 and with the help of the cover band 115 upwardly to the mentioned reversing station, not shown in the drawing, from which the cell band may be guided further in horizontal direction or the material be transmitted to a downstream arranged further conveyor.

The embodiment illustrated in FIGS. 3 and 4 provide likewise a high output since practically the whole length of the jib 101 is used for the reception of the material and since the material is transported by the drum 102 and the shovels thereon at high speed and without any loss to the upright conveyor.

In summarizing, it is pointed out that the improvement obtained by the construction of the present invention with respect to similar transporting systems known in the art, essentially consists in an improvement of the material pickup efficiency based on an optimal cutting face, by a quick succession of cuts, as well as the transmission of the picked up material without loss to the upright conveyor and the therewith connected increase in the output of the system.

It will be understood that each of the elements described above, or two or more together, may also find a useful application in other types of material conveyor systems with pneumatically or mechanically operated substantially upright conveyor means provided with a device for loosening and transporting the material to the upright conveyor means differing from the types described above.

While the invention has been illustrated and described as embodied in a material conveying system provided with a device for loosening and transporting the material to an upright pneumatically or mechanically operated conveyor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A material conveying system, especially for unloading of ships, comprising substantially upright support means; an adjustable jib connected to the bottom end of said upright support means, extending transverse to the latter and being provided at the upper side thereof with an elongated material inlet opening; means turnably mounted about said tubular jib and extending substantially over the whole length thereof for loosening material and for transporting the loosened material through said inlet opening into the interior of said jib, said material loosening and transporting means including a drum provided over the whole length thereof with circumferentially uniformly spaced shovels; drive means connected to said material loosening means for rotating the latter about the axis of said tubular jib; a driven endless band conveyor provided with a plurality of plates projecting uniformly spaced from each other in the direction of the band of the conveyor substantially normal therefrom to form a succession of material receiving cells which are open at the sides thereof opposite from said band, said band conveyor having a first portion extending beneath the material inlet opening through said jib to directly receive the material from said material loosening means and a second substantially vertical rising portion extending through said upright support means to uninterruptedly transport the material loosened by said material loosening means to a material receiving station; and a driven cover band extending parallel to said rising portion of said conveyor and covering the open sides of cells, said drum having a front end distant from said upright support means, and including a frustoconical head member coaxially connected to said front end of said drum for rotation therewith and provided on its outer surface with a plurality of uniformly displaced reaming plates to facilitate penetration of the outer end of said jib into a heap of material to be transported.

2. A material conveyor system as defined in claim 1, wherein said tubular jib has an outer peripheral surface supporting said rotating material loosening and transporting means and an inner peripheral surface, said conveyor extending through the interior of said tubular jib having a conveying surface separate from said inner surface.

3. A material transporting conveyor as defined in claim 2, wherein said tubular jib is constituted by a one-piece hollow cylinder having a single interior inlet opening extending substantially over the whole length thereof.

4. A material conveyor system as defined in claim 1, wherein said drum is composed of a plurality of drum sections, each provided over the whole length thereof with a plurality of circumferentially spaced shovels.

5. A material conveyor system as defined in claim 4, wherein said drum sections are rotatably mounted on said jib and comprising axially spaced annular discs, said shovels extending between and being fastened to said annular discs.

6. A material conveyor system as defined in claim 5, wherein said shovels on one drum section are circumferentially spaced with respect to the shovels on an adjacent drum section.

7. A material conveyor system as defined in claim 1, and including fluid operated cylinder and piston means pivotally connected at opposite ends to said upright support means and to said jib for adjusting the position of the latter relative to said upright support means.

8. A material conveyor system as defined in claim 1, and including roller means mounted on said material loosening means for rollingly support the latter on the outer peripheral surface of said jib.

* * * * *